United States Patent Office

3,647,723
Patented Mar. 7, 1972

3,647,723
PROCESS FOR PREPARING EXPANDABLE VINYL AROMATIC POLYMERS
Stanislav Mysik and Jaromir Trneny, Kralupy nad Vltavou, Czechoslovakia, assignors to Kaucuk, narodni podnik, Kralupy, Czechoslovakia
No Drawing. Filed Sept. 12, 1969, Ser. No. 857,545
Claims priority, application Czechoslovakia,
Sept. 20, 1968, 6,592/68
Int. Cl. C08j 1/26
U.S. Cl. 260—2.5 B    10 Claims

ABSTRACT OF THE DISCLOSURE

Expandable vinyl aromatic polymers having reduced lumping and stickiness in the course of preexpansion are prepared by polymerizing a vinyl aromatic monomer in an aqueous suspension in presence of a wax having a melting point from 70° C. to 120° C., acid number from 0 to 45, saponification number from 3 to 150. The polymerization temperature is raised above the melting point of the wax, but not exceeding 130° C. for 0.5 to 25 hours in presence of the wax.

BACKGROUND OF THE INVENTION

This invention relates to expandable vinyl aromatic polymers and particularly to a process for the production of expandable vinyl aromatic polymers having reduced tendency to lump and bond in the preexpansion stage.

Expandable vinyl aromatic polymers for example, polystyrenes are commonly prepared in the form of beads which are then foamed and moulded in two separate stages. In the first stage, the beads are heated to the softening range of the polymer and pre-expanded to a density slightly less than that of the finished moulding and to a volume several times that of the beads. After a due time of maturing, the beads are, in the second stage inserted into a mould having the shape of a desired article such as a panel or the like, and repeatedly heated to the softening range of the polymer until the expanding process is completed. The expanding beads finally fill the entire mould and fuse together into a coherent moulded article having low specific gravity and excellent insulating qualities.

Polymers particularly of the vinyl aromatic type and others of a similar nature have a tendency to stick to each other in the first or preexpansion stage of the moulding process and to form strongly bonded clumps or agglomerates. This is so particularly in moulding articles of complicated shape. High stickiness lowers the capacity and efficiency of the preexpansion equipment and the clumps or agglomerates cannot be conveyed properly through the processing plant. Moreover, the presence of the clumps result in a foamed plastic moulding which undesirably varies in density from one part to another.

A method has been suggested to coat the surface of expandable polystyrene beads with 0.005% to 0.05% by weight of a fluid siloxane polymer sprayed in the form of an emulsion or solution on the beads which is subsequently carefully dried and moulded. It has also been suggested to coat the surface of expandable polystyrene beads before expanding with a mixture of fine caolin clay and totally hydroxypropylated alkylene diamine.

These processes are not efficient nor effective since they introduce a new step, coating, into the preparation of expanded articles and coatings may be abraded and flaked off.

Various other suggestions have been made to solve this problem, as for example, incorporating in the suspension fatty acids or similar lubricant, impregnating the beads in suspension with isopentane having dissolved paraffinic hydrocarbons, or incorporating therein organic resinous polymeric substance. None of these suggestions have solved the problem, and in fact some of these suggestions, such as the use of high concentrations of lubricants have actually resulted in increased stickiness and clumping.

It is the prime object of this invention to provide improved vinyl aromatic polymers and particularly polymers having low preexpansion stickiness and clumping characteristics.

It is an object of the present invention to provide a process for the production of expandable vinyl aromatic polymers having low stickiness and clumping characteristics.

It is another object of this invention to provide an improved polystyrene and method for its manufacture by an aqueous suspension polymerization process which results in beads having low stickiness and clumping in the preexpansion stage.

These and other objects as well as numerous advantages will be apparent from the foregoing description.

DESCRIPTION OF THE INVENTION

In general the present invention may be employed in any basic process for forming beads of expandable vinyl polymers. As the description progresses this will be apparent, however, it is preferred that the present invention be employed in conjunction with the process for forming such material as is fully described within copending U.S. patent application Ser. No. 752,160 filed Aug. 13, 1968 in the name of Stanislav Mysik et al. In that application an expandable polystyrene (or other vinyl aromatic polymer) is prepared by polymerizing 100 parts (by weight) styrene mechanically suspended in water, until a 30–70% conversion of the monomer and a viscosity not exceeding 70 p. at 40° C. of the suspended hydrocarbon phase is achieved. The suspension is then stabilized and polymerization continued to a conversion of at least 99%. A foaming agent is incorporated in the suspension to obtain expandability.

For the sake of brevity a more detailed description of the preferred method need not be given herein, however reference to the aforementioned application is made herein as if fully set forth.

According to the present invention an expandable vinyl aromatic polymer is prepared by polymerizing an aqueous suspension of vinyl aromatic monomer in the presence of a polymerization catalyst as taught for example, by the aforementioned application, and from 0.02% to 0.3% preferably 0.05% to 0.15% by weight, related to the monomer, of a wax, having melting point from 70° C. to 120° C., an acid number from 0 to 45, saponification number from 3 to 150. The polymerization temperature is raised above the melting point of the wax, but preferably not exceeding 130° C., for 0.5 to 25 hours in presence of the wax. The foaming agent is preferably admixed into the suspension after the addition of the wax and in the course of the polymerization. The suspension is kept under polymerization conditions until at least 99 parts of the monomer are converted to the polymer.

It has been found that the wax may be admixed to the vinyl aromatic monomer before forming the suspension, but admixing when the suspension has been formed and conversion from 0% to 65% of the monomer to the polymer has been reached is preferable and has added processing advantages.

As will be seen from the examples which follow herein, vinyl aromatic polymer made in according with the present invention have markedly reduced tendencies to stick, bond together or clump in the preexpansion stages of moulding.

Decreasing the stickiness of the beads may be further enhanced by admixing together with the monomer and wax, a zinc, calcium or aluminium salt of a fatty acid, having from 16 to 20 carbon atoms in the chain, in amounts from 0.001% to 0.03% by weight, related to the amount of monomer. The fatty acid may be stearic acid, palmitic acid, heptadecylic acid, nonandecylic acid, arachidic acid or their mixture. The salt may be dissolved in the vinyl aromatic monomer before forming the suspension or to the suspension before conversion of 65% by weight of the monomer to the polymer is reached.

The vinyl aromatic monomer may be styrene or its derivatives and may be copolymerized with a co-monomer, for example acrylonitrile, divinylbenzene or derivatives of styrene such as the lower substituted styrenes and mixtures thereof.

The wax used in this invention may be any of the common natural or synthetic materials of a waxy nature having saponifiable groups and a saponification number in the range of 3-150. Waxes are generally characterized by their physical and chemical constants e.g. melting point, refractive index, specific gravity, hardness, saponification number, acid number, hydrocarbon content, iodine number, and acetyl number. Melting point, saponification number, and acid number were used in this specification to distinguish the suitable waxes which are most preferable. Preferable and suitable waxes, their properties and uses are described for example, in R. E. Kirk, D. F. Othmer: Encyclopedia of Chemical Technology, vol. 15, pp. 1–17, USA 1956, or in H. Rompp: Chemie Lexikon, vol. 2, p. 4772, Stuttgart, 4th edition. Waxes which are suitable, include but are not limited to the following: Hoechst Wachs R 21, Hoechst Wachs R 21 Neu, BASF Wachs O, BASF Wachs E (All trademarks).

EXAMPLES OF PRIOR PROCESSES

To enable a comparison to be made between the present and prior processes and to make the advantages of the present invention more apparent, the following examples A, B, C are set forth. In the example A a standard polymerization process (without the addition of a wax during the suspension polymerization) is described. Examples B and C repeat example A with the exception that waxes having the properties and characteristics out of the range of the present invention are used.

Example A

A 60-liter pressure stainless vessel equipped with a stirrer and a cooling jacket was charged with 28 l. of water, 25 kg. of styrene, and 51 g. of 75% dibenzoylperoxide. Air was removed by nitrogen exhaust process. The polymerization process was started under continual stirring by increasing the temperature of the suspension up to 85° C. The suspension was polymerized at this temperature until 52% conversion was reached. Thereafter 950 ml. of 4% solution of polyvinylalcohol in water was admixed with it. The temperature was then decreased to 80° C. and 68 g. of 75% dibenzoylperoxide and 26.8 g. tertiary butylperbenzoate were incorporated into the suspension. Polymerization was continued at 80° C. for 2.5 hours. Thereafter, the temperature of the suspension was decreased to 20° C. and 1900 g. of an aliphatic hydrocarbon having the boiling point from 30° C. to 40° C. was admixed. The polymerization was then continued at 50° C. for 2 hours, at 85° C. for 2 hours, and at 110° C. for 2 hours. Finally, the suspension was cooled and the resultant beads separated, washed, and dried.

Example B

The Example A was repeated with the exception that 25 g. of paraffin wax having the melting range 58–60° C. was admixed to the suspension when 40% conversion was reached.

Example C

The Example A was repeated with the exception that 25.4 g. of polyethylene wax having acid number 0, saponification number 0, and melting point 90° C. was admixed when 40% conversion was reached.

The resultant beads were evaluated in a manner to be fully described later for their tendency to stick and bond together in the preexpansion stage. As indicated in the accompanying table the beads of each of these examples exhibited a high degree of stickiness and tendency to clump showing the poor characteristics of prior art vinyl aromatic polymers.

EXAMPLES OF THE PRESENT INVENTION

The following Examples 1–14 illustrate the present invention and employ waxes such as those previously set forth. In each the resultant beads were evaluated in a similar manner to those of Examples A to C and their characteristics shown on the accompanying table. In Examples 1 through 8 and 11 through 14 the basic procedure of polymerization follows that described in Examples A through C. Examples 9 and 10 describe a somewhat modified procedure.

Example 1

The procedure of Example A was repeated with the exception that 12.7 g. of a wax having acid number 14, saponification number 119, and melting point 79° C. was admixed to the initial charge.

Example 2

The Example A was repeated with the exception that 25.4 g. of a wax having acid number 14, saponification number 119 and melting point 79° C. was admixed to the suspension when 30% conversion was reached.

Example 3

The Example A was repeated with the exception that 50.8 g. of a wax having acid number 14, saponification number 119, and melting point 79° C. was admixed to the suspension when 60% conversion was reached.

Example 4

The Example A was repeated with the exception that 12.7 g. of a wax having acid number 14, saponification number 119, and melting point 79° C., and 0.3 g. zinc stearate were admixed when 40% conversion was reached.

Example 5

The Example 1 was repeated with the exception that 1.3 g. calcium stearate was admixed when 40% conversion was reached.

Example 6

The Example A was repeated with the exception that 12.7 g. of a wax having acid number 14, saponification number 119 and melting point 79° C., and 6.3 g. of aluminium stearate were admixed when 60% conversion was reached.

Example 7

The Example A was repeated with the exception that 12.7 g. of a wax having acid number 1, saponification number 20.3 and melting point 94° C. was admixed when 40% conversion was reached.

Example 8

Example 7 was repeated with the exception that 25.4 g. of the wax was employed.

Example 9

A 60-liter pressure stainless vessel equipped with a stirrer and a cooling jacket was charged with 12.5 kg. of styrene and 12.5 kg. of polystyrene beads. The polystyrene having average molecular weight 200,000 was dissolved in the styrene at from 20 to 23° C. under stirring. Thereafter, 25 g. of a wax having acid number 1, saponification number 20.3 and melting point 94° C., 68 g. dibenzoylperoxide and 27 g. tertiary butylperbenzoate were admixed, the temperature of the solution was increased up to 80° C. and 28 l. of water and 950 ml. of 4% aqueous solution of polyvinylalcohol were added. The polymerization was carried out under stirring at 80° C. for 2.5 hours, the suspension was then cooled to 20° C. and 1900 g. of aliphatic hydrocarbon having the boiling point from 30° C. to 40° C. were admixed. The polymerization was then continued as described in Example A.

Example 10

A 10-liter stainless steel pressure vessel equipped with a stirrer and a cooling jacket was charged with 3.2 g. of styrene, 4 g. of dibenzoylperoxide and 3.5 g. of a wax having acid number 14, saponification number 119 and melting point 79° C. Air was removed by means of nitrogen and the polymerization was started under continual stirring by increasing the temperature up to 85° C. and continued until 45% conversion was reached when 4 l. of water and 120 ml. of 4% aqueous solution of polyvinylalcohol were admixed. The resultant suspension was cooled to 80° C. and 8.5 g. dibenzoylperoxide and 4 g. tertiary butylperbenzoate were admixed. The polymerization continued at 80° C. for 3.5 hours at which time the suspension was then cooled to 20° C. and 250 g. of hydrocarbon fraction having boiling point from 30° C. to 40° C. was admixed. The polymerization further continued as described in Example A.

Example 11

The Example 4 was repeated with the exception that instead of 0.3 g. zinc stearate the same amount of calcium stearate were admixed to the suspension.

Example 12

The Example 11 was repeated with aluminium stearate instead of calcium stearate.

The following examples are also illustrative of the present invention:

Example 13

The Example A was repeated with the exception that 20.6 g. of a wax having acid number 12, saponification number 146, and melting point 73° C., was admixed to the suspension when 46% conversion was reached.

Example 14

The Example A was repeated with the exception that 12.5 g. of a wax having acid number 37, saponification number 25, and melting point 112° C. was admixed to the suspension when 40% conversion was reached. After the foaming agent was admixed, the polymerization continued at 50° C. for 2 hours, at 85° C. for 2 hours, at 110° C. for 2 hours and at 120° C. for 1 hour.

PRODUCT EVALUATION

The resultant beads, of all the examples, were evaluated by pouring a measured 0.5 kg. of them on the surface of a square meter of preheated water having a temperature from 94° C. to 96° C. where they were caused to preexpand. After one minute of preexpansion the layer of beads was stirred and the tendency of the beads to stick to each other was investigated. The stickiness was expressed in four objective numerical degrees:

0—No stickiness (i.e. after the stirring the beads remain separated)
1—Slight stickiness (i.e. after the stirring sporadic clumps of the size 2 cm. are observed)
2—Moderate stickiness (i.e. after the stirring many clumps of the size over 2 cm. are observed)
3—Strong stickiness (i.e. after the stirring big agglomerates of rubbery character are observed)

The foam ability of the beads was then evaluated by expanding the beads in 100° C. water for 4 minutes.

We have found that for the optimum effectiveness and efficiency, during the moulding process, that the range of stickiness (as defined) should not exceed 0.5 in the numerical scale (i.e. it should range between 0 to 0.5). The upper range on the numerical scale, where beads can still be used but not with as great efficiency and effectiveness should not exceed 1.5 (i.e. at a range between 0.5 and 1.5).

The following table compares the resultant beads according to the above evaluation at varying levels of foaming.

TABLE

| Example No. | Foamability/ fraction 0.5–3.0 mm./g./l. | Stickiness factor 0.5–3.0 mm. fraction | 0.25–0.5 mm. fraction | 0.5–0.8 mm. fraction | 0.8–1.25 mm. fraction | 1.25–3.0 mm. fraction |
|---|---|---|---|---|---|---|
| A | 13.7 | 1–1.5 | 2 | 1.5–2 | 1–1.5 | 1 |
| B | 13.9 | 1.5 | 2 | 2 | 1–1.5 | 1 |
| C | 14.1 | 1–1.5 | 2 | 1.5–2 | 1–1.5 | 1–1.5 |
| 1 | 12.8 | 0–0.5 | 0–0.5 | 0–0.5 | 0 | 0 |
| 2 | 14.9 | 0 | 0 | 0 | 0 | 0 |
| 3 | 13.8 | 0.5 | 0.5 | 0.5 | 0.5 | 0.5 |
| 4 | 13.5 | 0 | 0 | 0 | 0 | 0 |
| 5 | 13.0 | 0 | 0–0.5 | 0 | 0 | 0 |
| 6 | 14.5 | 0 | 0 | 0 | 0 | 0 |
| 7 | 13.8 | 0.5 | 0.5 | 0–0.5 | 0–0.5 | 0 |
| 8 | 14.3 | 0.5 | 0.5 | 0–0.5 | 0–0.5 | 0 |
| 9 | 13.8 | 0.5 | 0.5 | 0–0.5 | 0–0.5 | 0 |
| 10 | 13.5 | 0–0.5 | 0.5 | 0.5 | 0–0.5 | 0 |
| 11 | 12.8 | 0 | 0 | 0 | 0 | 0 |
| 12 | 14.9 | 0 | 0 | 0 | 0 | 0 |
| 13 | 14.6 | 0–0.5 | 0.5 | 0.5 | 0–0.5 | 0–0.5 |
| 14 | 14.2 | 0.5 | 0.5 | 0.5 | 0.5 | 0.5 |

It will be observed from the foregoing table that the Examples A–C, illustrative of the prior art, resulted in either unacceptable or only marginal levels of stickiness while in each of the examples of the present invention the stickiness factor fell into the optimum range of 0–0.5.

Similar examples employing waxes within the total range of melting points, acid numbers and saponification numbers will show equally good results.

What is claimed:
1. A process for preparing an expandable vinyl aromatic polymer, which comprises:
   (a) polymerizing an aqueous suspension of a vinyl aromatic monomer in the presence of a wax,
      (1) said wax having melting point from 70° C. to 120° C., acid number from 0 to 45, saponification number from 3 to 150,
      (2) the amount of said wax being from 0.02% to 0.3% by weight, related to said monomer,
   (b) thereafter increasing the temperature of said suspension in the course of the polymerization above the melting point of said wax, but not exceeding 130° C., for from 0.5 to 25 hours,
   (c) admixing a foaming agent to said suspension in the course of the polymerization and after the addition of said wax,
   (d) thereafter keeping said suspension under polymerization conditions until at least 99% conversion of said monomer to said polymer is reached.
2. A process is set forth in claim 1, wherein the amount of said wax is from 0.05% to 0.15% by weight, related to the amount of said monomer.
3. A process as set forth in claim 1, wherein the wax is admixed to said monomer before forming the suspension.
4. A process as set forth in claim 1, wherein the wax is admixed to said suspension when conversion from 0% to 65% of said monomer to said polymer is reached.
5. A process as set forth in claim 1, wherein said vinyl aromatic monomer is styrene.
6. A process as set forth in claim 1, wherein said monomer is polymerized in the presence of a metal salt of a fatty acid in the amount from 0.001% to 0.03% by weight, related to the amount of said monomer, said fatty acid having from 16 to 20 carbon atoms in the chain, and said metal being selected from the group consisting of zinc, calcium and aluminium.

7. A process as set forth in claim 6, wherein said salt is admixed to said suspension together with said wax.

8. A process as set forth in claim 6, wherein said fatty acid is selected from the group consisting of stearic acid, palmitic acid, heptadecylic acid, nonandecylic acid, and arachidic acid.

9. A process as set forth in claim 6, wherein said salt is admixed to said vinyl aromatic monomer before forming said suspension.

10. A process as set forth in claim 6, wherein said salt is admixed to said suspension when conversion from 0% to 65% of said monomer to said polymer is reached.

References Cited
UNITED STATES PATENTS

| | | | |
|---|---|---|---|
| 3,060,138 | 10/1962 | Wright | 260—2.5 B |
| 3,224,984 | 12/1965 | Roper et al. | 260—2.5 B |
| 3,320,188 | 5/1967 | Dijkema | 260—2.5 |
| 3,398,105 | 8/1968 | Roper et al. | 260—2.5 B |

SAMUEL H. BLECH, Primary Examiner

M. FOELAK, Assistant Examiner

U.S. Cl. X.R.

260—28.5 R, 93.5 W